(12) United States Patent
He et al.

(10) Patent No.: US 7,201,321 B2
(45) Date of Patent: Apr. 10, 2007

(54) ELECTRO-OPTICALLY READING DIRECT PART MARKINGS ON WORKPIECES BY IMAGE CAPTURE

(75) Inventors: Duanfeng He, South Setauket, NY (US); Miroslav Trajkovic, Coram, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 232 days.

(21) Appl. No.: 10/928,470

(22) Filed: Aug. 27, 2004

(65) Prior Publication Data

US 2006/0043187 A1   Mar. 2, 2006

(51) Int. Cl.
*G06K 7/10* (2006.01)
*G06K 9/24* (2006.01)
*G08C 21/00* (2006.01)

(52) U.S. Cl. .............................. 235/462.2; 235/462.21; 235/462.05; 235/462.06

(58) Field of Classification Search ........... 235/462.01, 235/462.05, 462.06, 462.2, 462.21
See application file for complete search history.

(56) References Cited

U.S. PATENT DOCUMENTS

| 4,877,949 | A | * | 10/1989 | Danielson et al. ...... 235/462.21 |
| 5,291,028 | A | * | 3/1994 | Droge et al. ................ 250/568 |
| 5,525,810 | A | * | 6/1996 | Jewell et al. ............... 250/566 |
| 5,550,362 | A | * | 8/1996 | Sherman ..................... 235/455 |
| 5,598,007 | A | * | 1/1997 | Bunce et al. ............... 250/566 |
| 5,734,153 | A | * | 3/1998 | Swartz et al. ........... 235/462.21 |
| 5,992,744 | A | * | 11/1999 | Smith et al. ............ 235/462.11 |
| 5,992,746 | A | * | 11/1999 | Suzuki .................... 235/462.21 |
| 6,188,801 | B1 | * | 2/2001 | Tsai et al. ..................... 382/294 |
| 6,619,547 | B2 | * | 9/2003 | Crowther et al. ........... 235/454 |
| 6,736,320 | B1 | * | 5/2004 | Crowther et al. ........... 235/454 |
| 6,745,942 | B1 | * | 6/2004 | Schramm et al. .......... 235/449 |
| 7,028,901 | B2 | * | 4/2006 | Carlson ................. 235/462.04 |
| 2001/0027999 | A1 | * | 10/2001 | Lee ....................... 235/462.45 |
| 2001/0038037 | A1 | * | 11/2001 | Bridgelall et al. ..... 235/462.14 |
| 2002/0020747 | A1 | * | 2/2002 | Wakamiya et al. .... 235/462.11 |
| 2002/0070278 | A1 | * | 6/2002 | Hung et al. ............. 235/472.01 |
| 2002/0117547 | A1 | * | 8/2002 | Krichever .............. 235/462.01 |
| 2002/0170965 | A1 | * | 11/2002 | Crowther et al. .......... 235/454 |
| 2003/0040969 | A1 | * | 2/2003 | O'Hagan et al. ............. 705/21 |
| 2003/0192949 | A1 | * | 10/2003 | Hattersley et al. ..... 235/462.43 |
| 2003/0226895 | A1 | * | 12/2003 | Havens et al. ......... 235/462.22 |
| 2004/0069855 | A1 | * | 4/2004 | Patel et al. ............ 235/472.01 |
| 2005/0023356 | A1 | * | 2/2005 | Wiklof et al. .......... 235/462.42 |
| 2005/0046873 | A1 | * | 3/2005 | Suzuki ....................... 356/605 |
| 2005/0258249 | A1 | * | 11/2005 | Giebel et al. .......... 235/462.11 |
| 2006/0071079 | A1 | * | 4/2006 | Hepworth et al. ..... 235/462.08 |
| 2006/0113389 | A1 | * | 6/2006 | Barkan .................. 235/462.21 |
| 2006/0118635 | A1 | * | 6/2006 | Joseph et al. .......... 235/462.24 |
| 2006/0163355 | A1 | * | 7/2006 | Olmstead et al. ........... 235/454 |
| 2006/0249581 | A1 | * | 11/2006 | Smith ........................ 235/454 |
| 2006/0255147 | A1 | * | 11/2006 | Havens et al. ......... 235/462.21 |

* cited by examiner

*Primary Examiner*—Daniel Walsh
(74) *Attorney, Agent, or Firm*—Kirschstein, et al.

(57) ABSTRACT

Performance of an imaging reader for electro-optically reading direct part markings on workpieces is enhanced by ensuring that such markings are read in the vicinity of an ideal, focused, target plane, and by enhancing the contrast of such markings. Calibration and self-calibration of the reader improve performance.

18 Claims, 5 Drawing Sheets

ELECTRO-OPTICALLY READING DIRECT PART MARKINGS ON WORKPIECES BY IMAGE CAPTURE

BACKGROUND OF THE INVENTION

1. Field of the Invention

The present invention generally relates to direct part markings on workpieces and electro-optically reading such markings by image capture and, more particularly, to improvements in aiming, ranging and illuminating such markings, as well as calibrating imaging readers during manufacture, and self-calibrating imaging readers during reading of such markings or other indicia.

2. Description of the Related Art

Direct part marking (DPM) allows workpieces to be directly marked, identified and traced to their origin, and its use is growing in the automotive, aerospace, electronics, medical equipment, tooling, and metalworking industries, among many others. Despite the ability to control very tight specifications on element size, width, spacing and so on, the lack of sharp contrast of machine-readable optical DPM codes directly marked on metal, plastic, leather, glass, etc., workpieces prevents traditional moving laser beam readers from electro-optically reading the DPM codes reliably. These moving beam readers emit a laser beam which reflects off the metal or glass workpieces as bright light.

To counter a variety of problems, such as lack of contrast, difficulty of maintaining precise element specifications, limited available marking areas, and a large amount of data to be encoded, the art proposed the use of matrix codes, especially the DataMatrix code, which reduces the required marking element size, precision and area, as well as contrast so that markings are able to be directly made on parts with, for example, steel or aluminum surfaces, and also proposed the use of imaging readers which use solid-state arrays similar to those used in digital cameras to capture an image of the marking. A microprocessor is used to analyze and decode the captured image of the matrix code.

Yet, the use of imaging readers, especially handheld readers, for reading marked workpieces has proven to be challenging. Contrast is still often less than desirable. Ambient lighting conditions are variable. Illumination from onboard illuminators is directed at variable angles. Reflections from ambient light sources and illuminators often appear in the field of view of the reader. Unlike machine-readable codes printed in one color (for example, black) on paper of another color (for example, white), DPM codes are typically difficult for a human operator to even find on the workpieces, which often have complicated shapes to further complicate finding the DPM code and aiming the reader directly at the DPM code for reading.

SUMMARY OF THE INVENTION

Objects of the Invention

Accordingly, it is a general object of this invention to provide an improved aiming system for an imaging reader to read DPM on workpieces.

More particularly, it is an object of the present invention to provide an improved ranging system for an imaging reader to read DPM on workpieces.

Still another object of the present invention is to provide an improved illuminating system for an imaging reader to read DPM on workpieces.

An additional object of the present invention is to provide a calibrating system for an imaging reader to read DPM on workpieces, or other optical codes.

It is yet another object of the present invention to provide a self-calibrating system for an imaging reader to read DPM on workpieces, or other optical codes.

Features of the Invention

In keeping with the above objects and others which will become apparent hereinafter, one feature of the present invention resides, briefly stated, in a method of, and a reader for, electro-optically reading direct part marking (DPM). In accordance with this invention, a solid-state imager is operative for capturing light over a field of view from the DPM located in a range of working distances relative to the reader. A first light projector is operative, upon activation by an operator, for example, by manually depressing a trigger, and prior to operation of the imager, for projecting a first light pattern in the field of view throughout the range. A second light projector is operative, also upon operator activation and prior to operation of the imager, for projecting a second light pattern in the field of view throughout the range in superimposition with the first light pattern. The light patterns are preferably visually different and have a predetermined visual relationship at a target plane within the range. A handheld housing supports the imager and the projectors, and is movable to a reading position in which the predetermined visual relationship is obtained to enable the imager to capture light from the DPM located in the vicinity of the target plane. For example, the human operator may perform the movement of the housing.

Preferably, the first light projector includes a first laser and a diffractive optical element for configuring the first light pattern as an aiming pattern having a marker, and the second light projector includes a second laser for configuring the second light pattern as a laser spot. In this case, the predetermined visual relationship is an overlap between the laser spot and the marker. Also, the marker is preferably crosshairs, and the aiming pattern preferably includes a frame at least partly surrounding the crosshairs.

In another preferred embodiment, the first light projector includes a first laser and a first diffractive optical element (DOE) for configuring the first light pattern as a first frame bounding a first central marker, and the second light projector includes a second laser and a second DOE for configuring the second light pattern as a second frame bounding a second central marker. The predetermined visual relationship is one of an overlap between the first and second markers and a contact between the first and second frames.

Another feature resides in an illuminator in the housing for illuminating the DPM during image capture by the imager. The imager may be located at a centerline of the housing. Alternatively, the imager and the illuminator are located at opposite sides away from a centerline of the housing. An off-center illuminator creates enhanced and emphasized shadows in the DPM and enhances contrast.

Yet another feature resides in storing coordinates of an overlapped point of two markers (including one marker and one laser spot) within the field of view to calibrate the reader, and to provide additional information to improve image capture and processing.

Still another feature resides in storing coordinates of the markers (including laser spots) within the field of view during successive readings to self-calibrate the reader.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
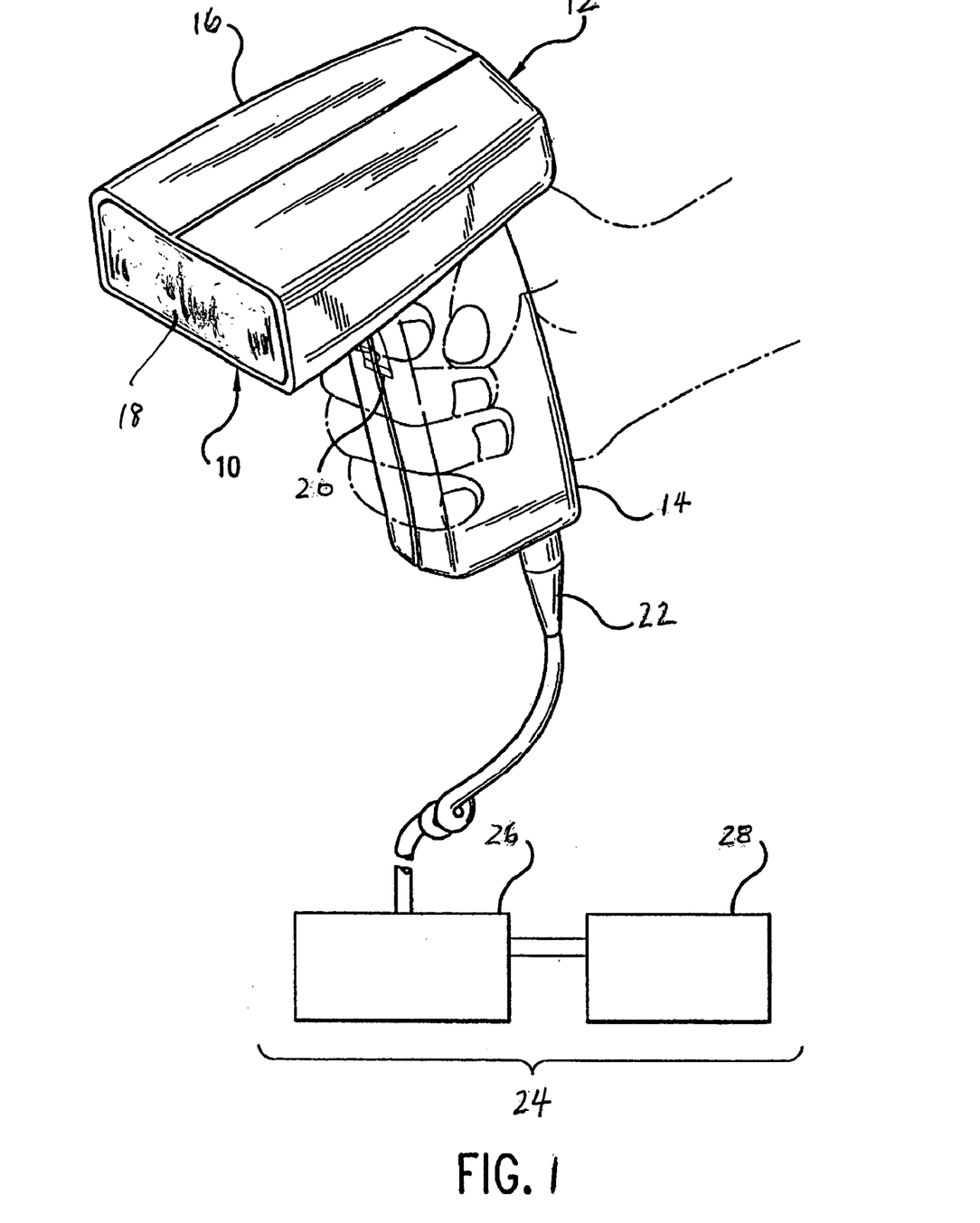
FIG. 1 is a perspective view of an imaging reader for electro-optically reading by image capture direct part markings on workpieces in accordance with this invention.

Reference numeral 10 in FIG. 1 generally identifies a handheld imaging reader for electro-optically reading DPM on workpieces. The reader 10 includes a housing 12 in which the various aiming, ranging, illuminating, calibrating and self-calibrating systems, as described in detail below in accordance with this invention, are incorporated. The housing 12 includes a generally elongated handle or lower handgrip portion 14 and a barrel or upper body portion 16 having a front end at which a light-transmissive window 18 is located. The cross-sectional dimensions and overall size of the handle 14 are such that the reader can conveniently be held in a user's hand. The body and handle portions may be constructed of a lightweight, resilient, shock-resistant, self-supporting material such as a synthetic plastic material. The plastic housing may be injection molded, but can be vacuum-formed or blow-molded to form a thin hollow shell which bounds an interior space whose volume is sufficient to contain the various systems of this invention.

A manually actuatable trigger 20 is mounted in a moving relationship on the handle 14 in a forward facing region of the reader. The user's forefinger is normally used to actuate the reader by depressing the trigger. A flexible electrical cable 22 may be provided to connect the reader to remote components of the code reading system. In alternative embodiments, the cable may also provide electrical power to the systems within the reader. In preferred embodiments, the cable 22 is connected to a host 24 which receives decoded data from the reader. In alternative embodiments, a decode module 26 may be provided exterior to the reader. In such an embodiment, decoded data from the decode module 26 may be transmitted to further host processing equipment and databases represented generally by box 28. If the cable 22 is not used, then a wireless link to transfer data may be provided between the reader 20 and the host 24, and an on-board battery, typically within the handle, can be used to supply electrical power.

An alternative embodiment incorporates a display and a keyboard, and optionally a wireless transceiver, preferably with an on-board decoder. The decoded data is then either transferred to a remote host computer in real time, or saved to an internal memory such that the stored data can be transferred to a host computer at a later time in batch mode, when the reader is physically connected to such a connected host computer.

Figure 2:
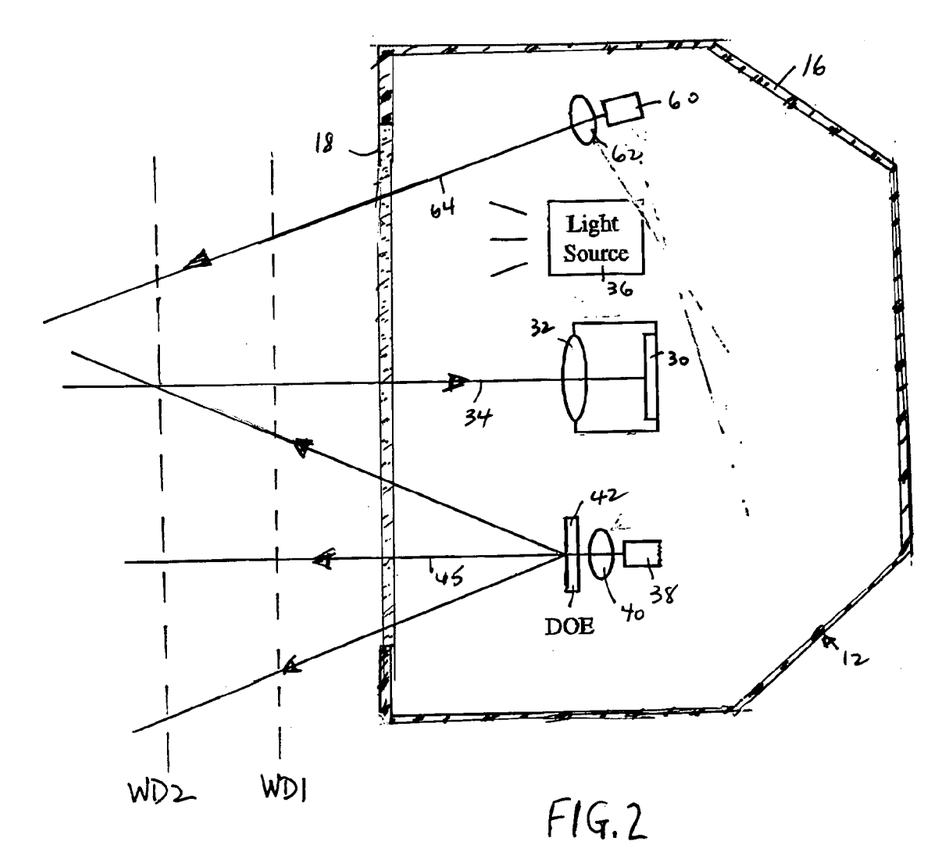
FIG. 2 is a diagrammatic plan view of an aiming and ranging system for use in the reader of FIG. 1.

A solid-state imager 30, as shown in FIG. 2, is mounted within the housing 12 and preferably is a two-dimensional, charge coupled device (CCD) or complementary metal oxide semiconductor (CMOS) array of cells or sensors operative for capturing light over its field of view from the DPM through the window 18 and into a lens assembly 32. The sensors produce electrical signals corresponding to a two-dimensional array of pixel information for an image of the DPM. The imager 30 and lens assembly 32 are aligned along a centerline or an optical axis 34 generally centrally located within the body portion 16. As shown in FIG. 2, the lens assembly 32 has a fixed focus and enables image capture over a range of working distances between close-in distance WD1 and far-out distance WD2 relative to the window 18. The imager and lens assembly are capable of acquiring a full image of the DPM in lighting conditions from two lux to direct sunlight. Exposure time is about 15 milliseconds. Resolution of the array can be of various sizes although VGA resolution of 640×480 pixels is preferred.

An illumination source 36 for the imager 30 is also provided to provide an illumination field for the imager. The source 36 preferably constitutes a plurality of light emitting diodes energized by power supply lines in the cable 22, or via the on-board battery. The source 36 is preferably pulsed in synchronism with the imager 30.

In accordance with the known art as exemplified by U.S. Pat. No. 6,340,114, an aiming and framing system employs a laser source and a diffractive optical element (DOE). In accordance with this invention, the aiming and framing system is enhanced to also function as a ranging system, which is employed to improve performance of the imaging reader by assisting the user in locating the ideal target plane within the working range at which to read the DPM. In DPM, the working range is often short and, as described above, the poor contrast, the complicated shapes of the workpieces, the variable ambient lighting conditions, and so on, make it difficult for the user to find the DPM and aim the reader directly at the DPM.

Figure 3:
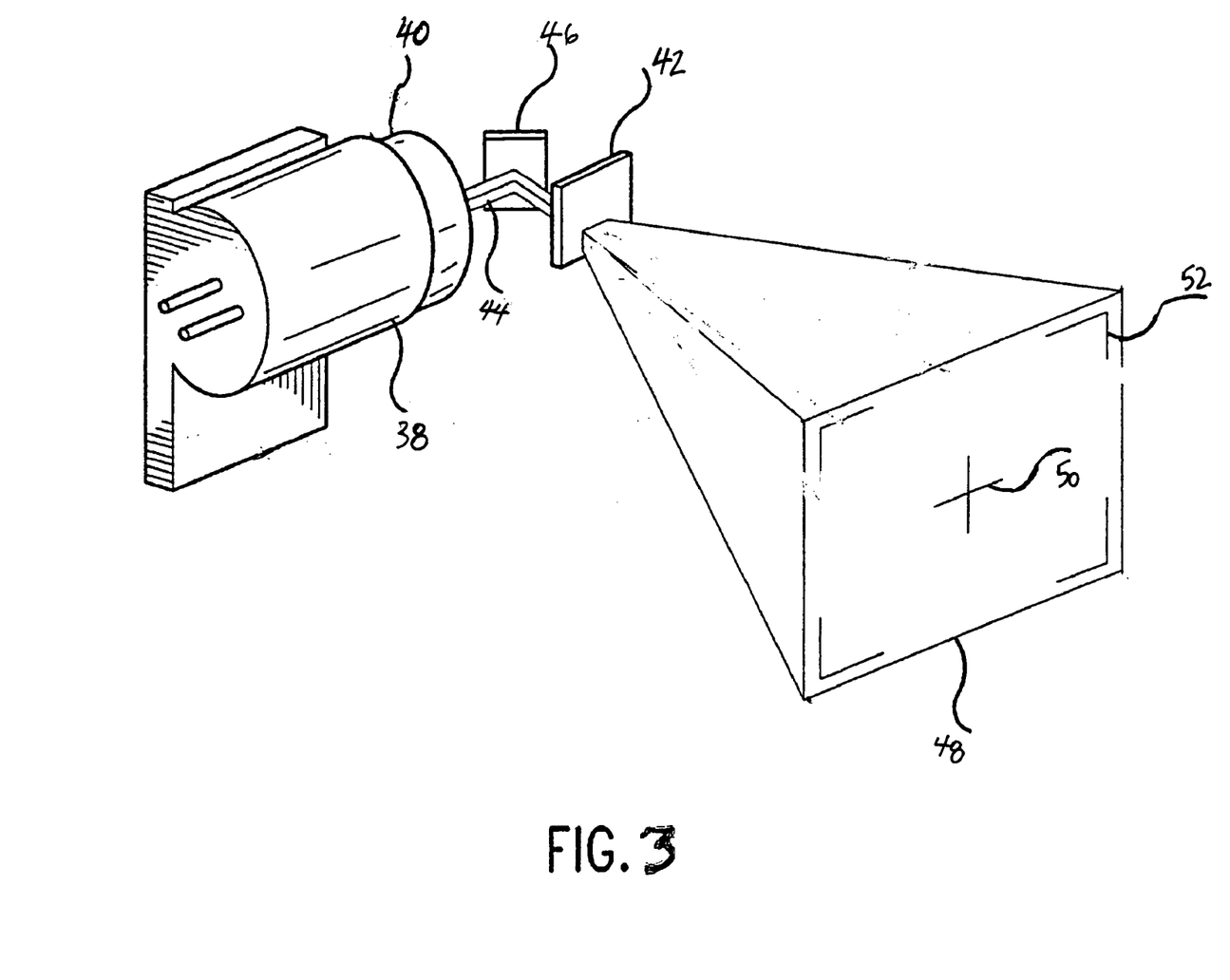
FIG. 3 is a perspective, schematic view of details of the system of FIG. 2.

As shown generally in FIG. 2, and in more detail in FIG. 3, an aiming system or first light projector includes a laser diode 38, a focusing lens 40, and a DOE 42. The diode 38 preferably has an output power of 5 milliwatts, a wavelength of 650 nanometers, and emits a laser beam 44 through the lens 40, and optionally for reflection off a fold mirror 46, through the DOE 42. The DOE 42 produces multiple diverging beamlets which exit the window 18 along optical axis 45 to project an aiming pattern through the working distance range as, for example, represented in FIG. 3 by a hypothetical target plane 48. The target plane 48 should be taken to correspond to any particular target plane in which the DPM might lie within the working distance range.

As shown in FIG. 3, the beamlets emanating from the DOE 42 project continuous lines or lines of spots in the direction of the target plane. These lines or spots are arrayed in a particular pattern suitable for providing a useful aiming frame to assist an operator in pointing the handheld reader at a target DPM code. An aiming frame 52 consists of four corner markers. Each of these corner markers itself consists of two intersecting continuous lines or lines of spots. The lines intersect at a 90° angle forming corners of a frame which corresponds generally to the angular field of view of the lens 32. Where spots are employed, the spots which form the corners are preferably four in each line, each line sharing the corner-most dot. A center marker 50 consists of two intersecting continuous lines or lines of spots, the lines intersecting at a 90° angle, thereby resembling crosshairs. Diffractive optics aiming creates a bright, crisp aiming pattern which provides ready feedback to the operator regarding image framing and centering and is similar to the aiming pattern found in many camera viewfinders.

Figure 4:
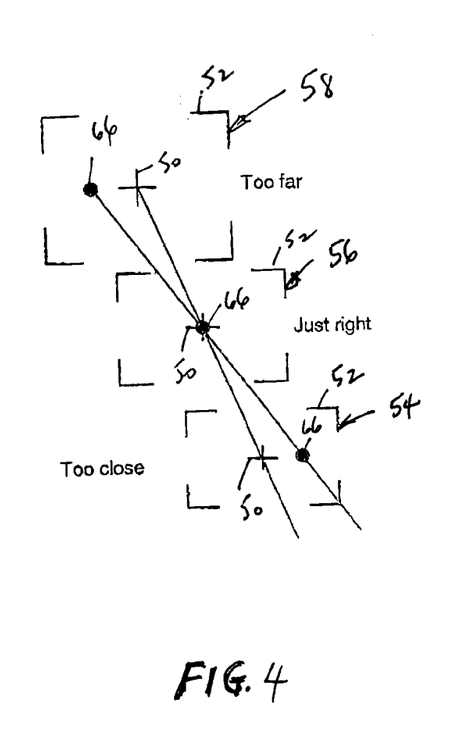
FIG. 4 is a perspective view of various light patterns produced by the system of FIG. 2 during use.

As described so far, an aiming pattern consisting of a frame 52 and crosshairs 50 is generated at a hypothetical reference plane 48 within a range of working distances between WD1 and WD2. As shown in FIG. 4, the aiming pattern expands as the distance between the DPM and the reader increases in a manner consistent with the expanding field of view of the imager 30. Pattern 54 is closer to the reader. Pattern 58 is further from the reader. Pattern 56 is located between the patterns 54, 58.

Another laser diode 60 and another focusing lens 62 constituting a second light projector are mounted in the reader of FIG. 2 and are operative to emit a laser beam along optical path 64 to produce a beam spot 66 in the field of view of the imager 30 within the aiming patterns 54, 56, 58. The second light projector adds the functionality of ranging. The center of the working distance range, i.e., the ideal distance to the target plane, is indicated by an overlap between the beam spot 66 and the crosshairs 50, and is depicted in FIG. 4 by pattern 56. In pattern 54, the beam spot 66 is shifted to the right of the crosshairs 50, thereby indicating that the DPM is located in a target plane too close to be read. In pattern 58, the beam spot 66 is shifted to the left of the crosshairs, thereby indicating that the DPM is located in a target plane too far to be read.

In use, once the trigger 20 is depressed to initiate decoding, the light projectors are energized, and the user sees the beam spot 66 and the aiming pattern on the workpiece and moves the handheld reader toward or away from the workpiece until the beam spot 66 overlaps the crosshairs 50. The user has now found the ideal distance to the DPM to be read and, of course, has centrally located the DPM within the aiming pattern. The imager is alternately activated with the aiming and ranging system after depression of the trigger such that when image quality is sufficiently good, a successful decode would be accomplished, even if the operator is still adjusting the distance between the reader and the workpiece.

Figure 5:
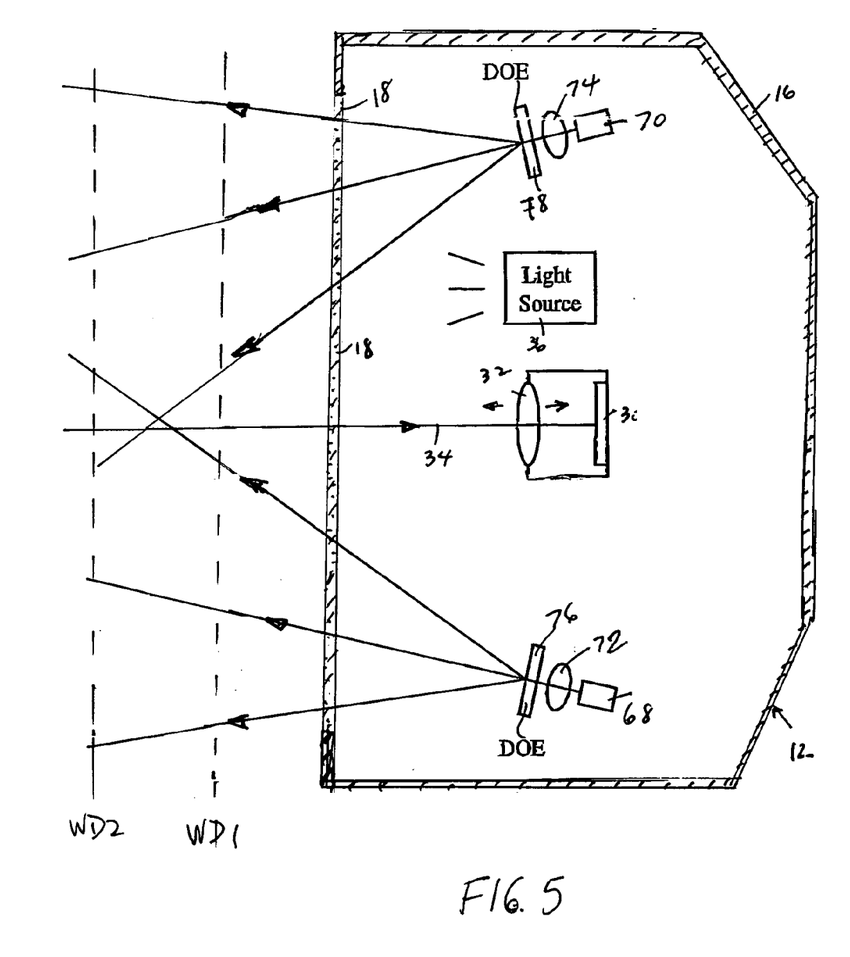
FIG. 5 is a diagrammatic plan view of a ranging and focusing system for use in the reader of FIG. 1.

The lens 32 of FIG. 2 need not be fixed, but could be movable, as schematically depicted in FIG. 5, between a pair of positions. Dual-focus readers, such as disclosed in U.S. Pat. No. 6,726,105 and U.S. Pat. No. 6,336,587 are used in order to enable the imager 30 to capture images at a near focus position or a far focus position, thereby greatly extending the working range. An alternative embodiment, as shown in FIG. 5, indicates the range for both focal positions and includes two groups of laser diodes 68, 70, two focusing lenses 72, 74, and two DOEs 76, 78. Each diode, lens and DOE group creates an aiming pattern in a manner analogous to that described above for diode 38, lens 40, and DOE 42 in connection with FIGS. 2–3. In this embodiment, the aiming pattern is different and comprises a diamond shaped frame 80, 82 (instead of, or in addition to, four corners 52) and a central dot (or, alternatively, the crosshairs 50) for each group.

Figure 6:
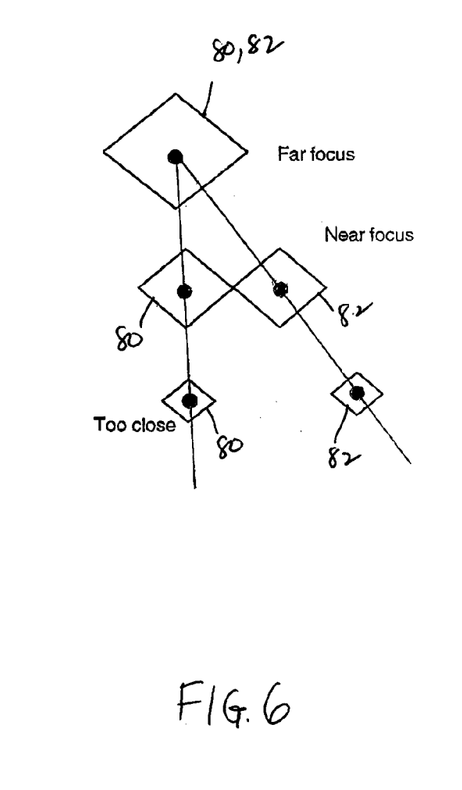
FIG. 6 is a perspective view of various light patterns produced by the system of FIG. 5 during use.

As shown in FIG. 6, frames 80, 82 from both groups expand in size as a function of increasing distance from the reader. The "near focus" position is indicated when the near corners of the diamond shaped frames 80, 82 touch. The "far focus" position is indicated where the central dots within the frames 80, 82 overlap. A "too close" position is indicated by a separation between the frames.

Thus, in use, a focus position is chosen, either by the user or via a programmed controller, prior to image capture based on a variety of criteria such as the code type (e.g., paper or DPM), or the code size (e.g., low- or high-density DPM). The user moves the handheld reader toward or away from the DPM until a desired focus position is indicated, or until a successful image capture and decode are achieved.

Figure 7:
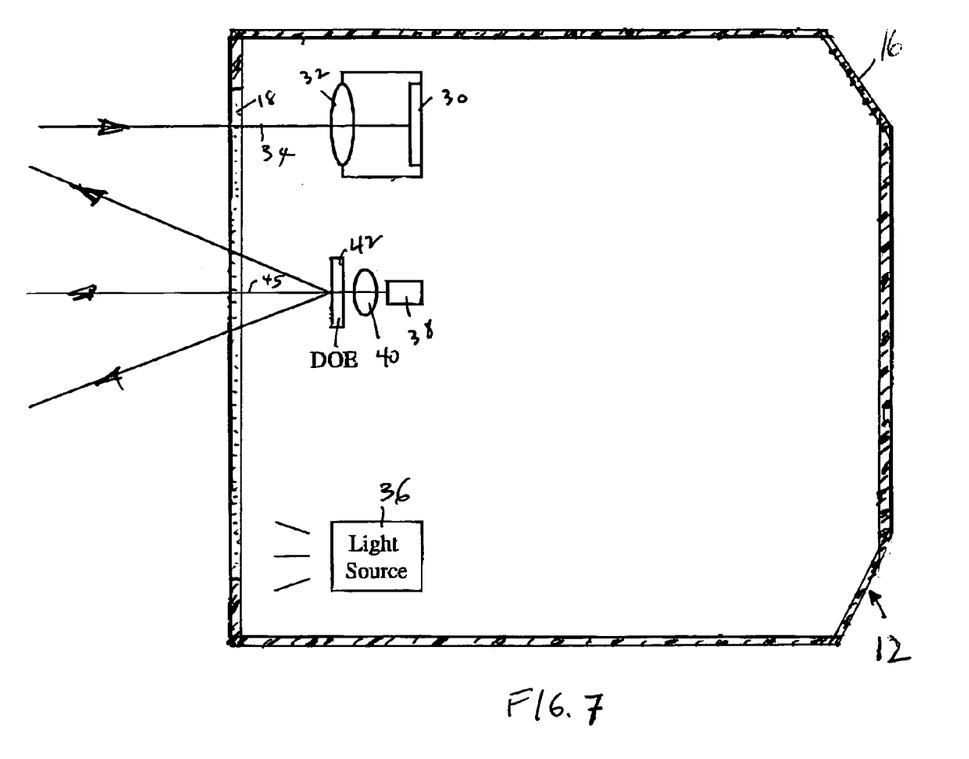
FIG. 7 is a view analogous to FIG. 2, but of a different embodiment.

FIG. 7 depicts another embodiment similar to that shown in FIG. 2, except that the imager 30 is not centrally located along a centerline of the body portion 16 of the reader, but instead is located remotely from the centerline. Also, the light source 36 is positioned off-center within the reader. The angle of illumination is thus more oblique. Oblique illumination creates distinct and contrasting highlights and shadows which greatly improve the visibility of DPM produced by laser etching or dot-peening of workpieces. A ranging system is not shown in FIG. 7 for simplicity. The illumination feature does not preclude or demand the ranging system.

The aiming and ranging systems assist the user to improve reader performance. They are turned off during image capture, a necessary step in decoding DPM. This is because the laser beams are very bright compared to any other source of illumination, and thus, if left on, would saturate the parts of image where they are illuminating, and thus prevent the DPM code from being properly decoded. However, due to manufacturing variations, the aiming systems of different readers do not necessarily aim at the same image coordinates. One objective of the present invention is to allow a user to use the aiming system to point to the DPM code during scanning, and have the reader know to where the user is pointing to facilitate setting the exposure of the imager and finding the code. To function as such, each imager must be calibrated during manufacture.

In the calibration process, the exact locations of the aiming pattern, through different working distances, are captured in the image, and recorded as calibration data in a permanent memory of the reader. This process can be automated, by capturing images, at different working distances, of a known, such as uniform, background, (e.g., a plain piece of paper), but with the aiming pattern turned on during image acquisition.

Additionally, when the reader contains a secondary light projector for ranging purposes, the calibration data can contain the exact location of the point where the two light patterns or markers meet. This data is obtained by capturing an image with the target at the exact plane where the patterns or markers meet, overlap, or assume some predetermined relationship.

Depending on the design, however, it is possible for the calibration data to be invalidated by motion between the imager and the aiming system. Such motion could be caused by shock impact. In other words, while the calibration data is expected to be intact over a period of usage, the relative position and/or orientation of the imager and the aiming system may shift such that the calibrated data does not indicate where the aiming pattern is trained at anymore. This is expected to be less of a problem for longitudinal shift, or shift along the optical axis, as there is always a working range in which the codes would come into clear enough focus. However, the problem is more pronounced for lateral shift, as a small relative rotation could mean a large discrepancy between the location of the DPM code in the image and the location indicated by the calibration data. It is thus advantageous to perform calibration on a set interval during use, or to perform it whenever the imager shows reduced performance that cannot be attributed to other, more obvious, reasons, such as a dirty window.

Figure 8:
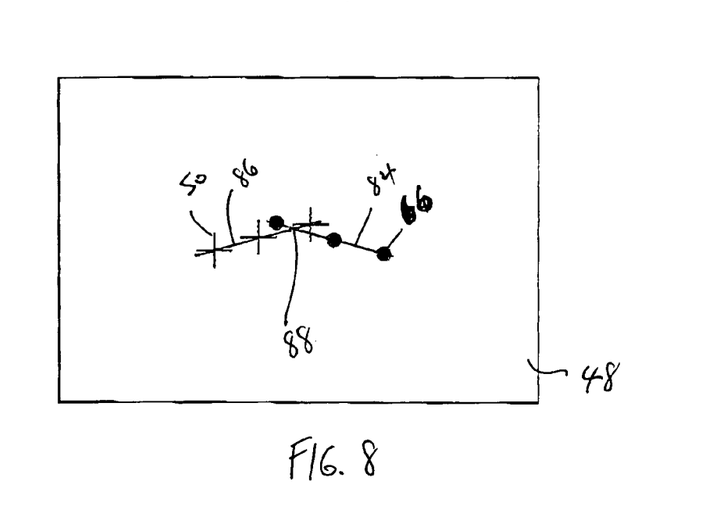
FIG. 8 is a diagrammatic view depicting operation during automatic self-calibration in accordance with this invention.

One preferred method to correct the problem of "calibration lateral shift or drift" is an automatic recalibration (ARC) method described herein. By "automatic", it is meant that the user is not required to knowingly and actively participate in the method. The ARC necessarily differs from normal calibration done in the factory, as it is not assured that the target being scanned is in perfect focus. However, as can be proven mathematically, the trajectory of the laser dot 66 in the image, while the laser dot is imaged at different focal distances, forms a straight line 84 as depicted in FIG. 8. The same is also true for a straight line 86 along which the centers of the crosshairs 50 lie. The straight line 86 is the desired line of calibration. The intersection of these two straight lines 84, 86 is the desired calibration point 88.

Therefore, to perform ARC, a set of images at different distances is taken, while the laser ranging features are turned on (same as in normal calibration). The images can be taken at different times, such as one image every time after the imager has performed a successful DPM reading. The images are not stored; rather, the coordinates (of two light patterns, such as the laser spot and the laser crosshairs) found from within them are stored. The set of coordinates derived this way are gradually updated to keep track of the "calibration drift", thus achieving ARC. Using this method, it is not necessary that an image be taken with the two laser-features overlap.

To successfully perform ARC as described here, two design constraints must be considered. First, the two laser beams should not be coplanar with the optical axis of the imager; otherwise, the two trajectories would be co-linear, and ARC as described here would not work. The other is that the two laser patterns that are meant to meet each other at the exact focus must be easily distinguishable. This second condition is satisfied by the first ranging feature discussed above, but not the second, unless the center dot in one of the patterns is changed into something else, such as crosshairs. Alternatively, the second condition can be replaced by one that enables images to be taken with only one laser projector turned on at a time, thus avoiding confusion between the two.

It will be understood that each of the elements described above, or two or more together, also may find a useful application in other types of constructions differing from the types described above.

While the invention has been illustrated and described as embodied in an imaging reader for electro-optically reading DPM, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A reader for electro-optically reading a direct part marking (DPM) in a reflective surface of a workpiece part, the DPM having different elements that reflect light with minimal contrast, comprising:
    a) a solid-state imager for capturing the light in a reading mode over a field of view from the DPM elements located in a range of working distances relative to the reader;
    b) a first light projector for projecting a first light pattern in a ranging mode in the field of view throughout the range;
    c) a second light projector for projecting a second light pattern in a ranging mode in the field of view throughout the range in superimposition with the first light pattern, the light patterns having a predetermined visual relationship at a target plane within the range, the projectors being inoperative during the reading mode to prevent the DPM elements from reflecting the light from the patterns and saturating the imager, wherein the imager stores coordinates of the locations of the light patterns at multiple working distances throughout the range to self calibrate the reader; and
    d) a handheld housing for supporting the imager and the projectors, the housing being movable to a reading position in which the predetermined visual relationship is obtained to enable the imager to capture light from the DPM elements located in a vicinity of the target plane.

2. The reader of claim 1, wherein the first light projector includes a first laser and a diffractive optical element for configuring the first light pattern as an aiming pattern having a marker.

3. The reader of claim 2, wherein the second light projector includes a second laser for configuring the second light pattern as a laser spot, and wherein the predetermined visual relationship is an overlap between the laser spot and the marker.

4. The reader of claim 3, wherein the marker is crosshairs, and wherein the aiming pattern includes a frame at least partly surrounding the crosshairs.

5. The reader of claim 1, wherein the first light projector includes a first laser and a first diffractive optical element (DOE) for configuring the first light pattern as a first frame bounding a first central marker, and wherein the second light projector includes a second laser and a second DOE for configuring the second light pattern as a second frame bounding a second central marker.

6. The reader of claim 5, wherein the predetermined visual relationship is one of an overlap between the first and second markers and a contact between the first and second frames.

7. The reader of claim 1, and an illuminator in the housing for illuminating the DPM elements during image capture by the imager in the reading mode.

8. The reader of claim 7, wherein the imager is located at a centerline of the housing.

9. The reader of claim 7, wherein the imager and the illuminator are located at opposite sides away from a centerline of the housing.

10. A method of electro-optically reading a direct part marking (DPM) in a reflective surface of a workpiece part, the DPM having different elements that reflect light with minimal contrast, comprising the steps of:
    a) capturing light the light in a reading mode over a field of view of a solid-state imager from the DPM elements located in a range of working distances;

b) projecting a first light pattern in a ranging mode in the field of view throughout the range;

c) projecting a second light pattern in the ranging mode in the field of view throughout the range in superimposition with the first light pattern, the light patterns having a predetermined visual relationship at a target plane within the range, the light patterns not being projected during the reading mode to prevent the DPM elements from reflecting the light from the light patterns and saturating the imager;

d) moving a handheld housing to a reading position in which the predetermined visual relationship is obtained to enable the imager to capture light from the DPM elements located in a vicinity of the target planet; and e) storing coordinates of the locations of the light patterns at multiple working distances throughout the range.

11. The method of claim 10, and configuring the first light pattern as an aiming pattern having a marker.

12. The method of claim 11, and configuring the second light pattern as a laser spot, and wherein the predetermined visual relationship is an overlap between the laser spot and the marker.

13. The method of claim 12, wherein the marker is crosshairs, and wherein the aiming pattern includes a frame at least partly surrounding the crosshairs.

14. The method of claim 10, and configuring the first light pattern as a first frame bounding a first central marker, and configuring the second light pattern as a second frame bounding a second central marker.

15. The method of claim 14, wherein the predetermined visual relationship is one of an overlap between the first and second markers and a contact between the first and second frames.

16. The method of claim 10, and illuminating the DPM elements with an illuminator during image capture by the imager in the reading mode.

17. The method of claim 16, and mounting the imager at a centerline of the housing.

18. The method of claim 16, and mounting the imager and the illuminator at opposite sides away from a centerline of the housing.

* * * * *